United States Patent
Choi et al.

(10) Patent No.: US 12,353,103 B2
(45) Date of Patent: Jul. 8, 2025

(54) DISPLAY DEVICE

(71) Applicant: LG Display Co., Ltd., Seoul (KR)

(72) Inventors: Seung Wan Choi, Paju-si (KR); Jae Kwang Lee, Paju-si (KR); Hwi Je Cho, Paju-si (KR); Je Heon Cha, Paju-si (KR); Ju Sung Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/528,667

(22) Filed: Dec. 4, 2023

(65) Prior Publication Data

US 2024/0219785 A1    Jul. 4, 2024

(30) Foreign Application Priority Data

Dec. 28, 2022  (KR) .................. 10-2022-0187744

(51) Int. Cl.
*G02F 1/1362*    (2006.01)
*G02F 1/1368*    (2006.01)

(52) U.S. Cl.
CPC .. *G02F 1/136209* (2013.01); *G02F 1/136222* (2021.01); *G02F 1/136286* (2013.01); *G02F 1/1368* (2013.01)

(58) Field of Classification Search
CPC ......... G02F 1/136209; G02F 1/136222; G02F 1/136286; G02F 1/1368
See application file for complete search history.

(56) References Cited

U.S. PATENT DOCUMENTS

| | | |
|---|---|---|
| 10,162,222 B2 | 12/2018 | Chae et al. |
| 2015/0370116 A1* | 12/2015 | Chae ................... G02F 1/13394 349/43 |
| 2017/0090228 A1* | 3/2017 | Ishikawa ........... G02F 1/136286 |
| 2019/0227365 A1* | 7/2019 | Park .................. G02F 1/133512 |

FOREIGN PATENT DOCUMENTS

| | | |
|---|---|---|
| KR | 10-2005-0001025 A | 1/2005 |
| KR | 10-1552902 B1 | 9/2015 |
| KR | 10-2020-0076205 A | 6/2020 |

* cited by examiner

*Primary Examiner* — James A Dudek
(74) *Attorney, Agent, or Firm* — Fenwick & West LLP

(57) ABSTRACT

A display device including a liquid crystal layer is provided. The liquid crystal layer may be disposed between a first substrate and a second substrate. The liquid crystal layer overlapping with a display area may be surrounded by a seal member disposed on a bezel, which is disposed outside the display area. A black matrix between the liquid crystal layer and the second substrate may include first openings in the display area and at least one second opening disposed between the display area and the seal member. A dummy color pattern between the first substrate and the liquid crystal layer may include a region overlapping with the second opening of the black matrix and a region disposed between the display area and the second opening.

24 Claims, 6 Drawing Sheets

DISPLAY DEVICE

CROSS-REFERENCE TO RELATED APPLICATION

This application claims the benefit of Republic of Korea Patent Application No. 10-2022-0187744, filed on Dec. 28, 2022, which is hereby incorporated by reference in its entirety.

BACKGROUND

Technical Field

The present disclosure relates to a display device generating an image using a change in transmittance of a liquid crystal layer by an electric field.

Discussion of the Related Art

Generally, a display device provides an image to user. For example, the display device may include a liquid crystal layer between a first substrate and a second substrate. The liquid crystal layer may overlap a display area. A seal member surrounding the liquid crystal layer may be disposed on a bezel area, which is disposed outside the display area.

The liquid crystal layer may have a transmittance corresponding to an electric field. A plurality of pixel areas may be disposed in the display area. An electric field corresponding to a data signal may be formed in each pixel area according to a gate signal. For example, a pixel electrode and a common electrode may be stacked in each pixel area.

A black matrix may be disposed between the liquid crystal layer and the second substrate. The black matrix may include first openings overlapping with the pixel areas and at least one second opening disposed between the display area and the seal member. A conductive pattern overlapping with the second opening of the black matrix may be disposed between the first substrate and the liquid crystal layer of the bezel area.

However, in the display device, an external light passing through the second opening may be reflected by the conductive pattern, such that the external light may enter the display area. Thus, in the display device, the image may be deteriorated by the external light. And, when a dummy color filter and/or additional black matrix is disposed on the conductive pattern to prevent the reflection by the conductive pattern in the display device, a curve due to the dummy color filter and/or additional black matrix may be generated in an upper surface of a lower planarization layer disposed between the first substrate and the liquid crystal layer of the bezel area. That is, in the display device, an upper surface of a gap spacer disposed between the lower planarization layer and the second substrate of the bezel area may have a height difference. Therefore, in the display device, the image may be distorted due to a gap deviation between the first substrate and the second substrate.

SUMMARY

Accordingly, the present disclosure is directed to a display device that substantially obviates one or more problems due to limitations and disadvantages of the related art.

An object of the present disclosure is to provide a display device capable of stably maintaining a gap between the first substrate and the second substrate by the gap spacer disposed on the bezel area.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the present disclosure, in one embodiment, a display device includes a first substrate including a display area and a bezel area surrounding the display area, the display area includes a pixel area where an image is displayed. The display device further includes a second substrate on the first substrate, and a liquid crystal layer between the first substrate and the second substrate. At least a portion of the liquid crystal layer is in the display area. The display device further includes a seal member between the first substrate and the second substrate in the bezel area. The seal member surrounds the liquid crystal layer. The display device further includes a color filter between the first substrate and the liquid crystal layer in the display area, a black matrix between the liquid crystal layer and the second substrate in the display area and the bezel area, and a dummy color pattern between the first substrate and the liquid crystal layer in the bezel area. The black matrix includes a first opening in the pixel area and a second opening in the bezel area such that the second opening is between the seal member and a boundary between the display area and the bezel area. The dummy color pattern overlaps the second opening of the black matrix and the dummy color pattern extends to the boundary between the display area and the bezel area.

In one embodiment, a display device includes a substrate including a display area and a bezel area. The display area includes a pixel area where an image is displayed. The display device also includes a liquid crystal layer on the substrate in the display area and the bezel area; a color filter between the substrate and the liquid crystal layer in the display area; and a black matrix on the liquid crystal layer. The black matrix includes a first opening in the pixel area and a second opening in the bezel area. The first opening overlaps the color filter. The display device also includes a lower planarization layer between the liquid crystal layer and the substrate in the display area and the bezel area. A first distance between a first portion of the substrate in the pixel area and a first portion of a surface of the lower planarization layer in the pixel area that overlaps the first portion of the substrate is a same as a distance between a second portion of the substrate that overlaps the second opening in the bezel area and a second portion of the surface of the lower planarization layer that overlaps the second portion of the substrate and the second opening in the bezel area.

In one embodiment, a display device includes a substrate including a display area and a bezel area. The display area includes a pixel area where an image is displayed. The display device also includes a liquid crystal layer on the substrate in the display area and the bezel area; a color filter between the substrate and the liquid crystal layer in the display area; a dummy color pattern between the substrate and the liquid crystal layer in the bezel area; and a black matrix on the liquid crystal layer. The black matrix includes a first opening in the pixel area and a second opening overlapping the dummy color pattern in the bezel area. A height of a portion of the dummy color pattern that overlaps with the second opening in the bezel area is a same as a height of a portion of the color filter in the pixel area.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
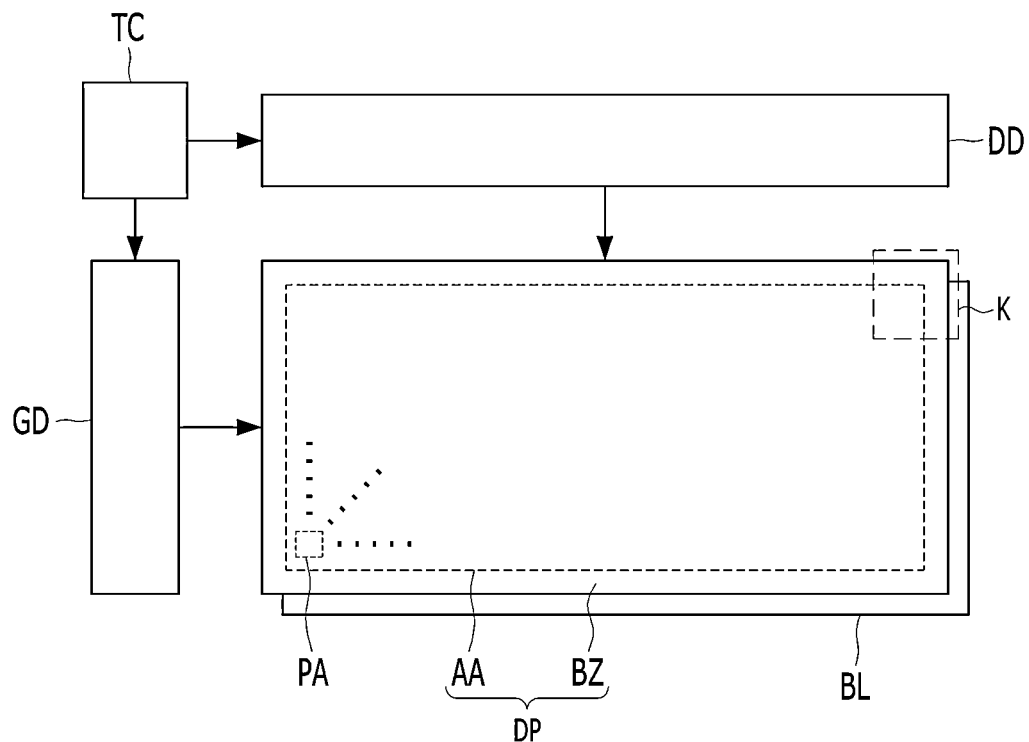
FIG. 1 is a view schematically showing a display device according to an embodiment of the present disclosure.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical spirit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

And, unless 'directly' is used, the terms "connected" and "coupled" may include that two components are "connected" or "coupled" through one or more other components located between the two components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 2:
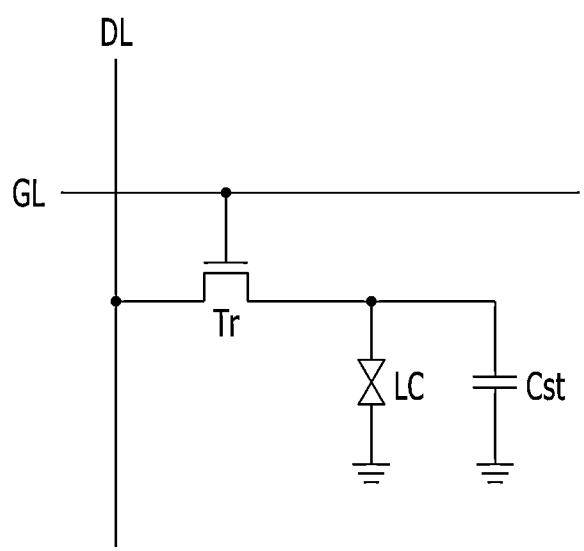
FIG. 2 is a view showing a circuit of an unit pixel area in the display device according to the embodiment of the present disclosure.

FIG. 1 is a view schematically showing a display device according to an embodiment of the present disclosure. FIG. 2 is a view showing a circuit of a unit pixel area in the display device according to the embodiment of the present disclosure.

Referring to FIGS. 1 and 2, the display device according to the embodiment of the present disclosure may include a display panel DP on a back-light unit BL. The back-light unit BL may provide light to an entire of the display panel DP. For example, the back-light unit BL may include a light-source module, a light-guide plate and at least one optical sheet. The display panel DP may generate an image provided to a user using the light provided from the back-light unit BL. For example, the display panel DP may include a plurality of pixel area PA.

Various signals may be provided in each pixel area PA through signal wirings GL and DL. For example, the signal wirings GL and DL may include gate lines GL sequentially applying a gate signal to each pixel area PA, and data lines DL applying a data signal to each pixel area PA. Each of the pixel areas PA may be electrically connected to a gate driver GD through one of the gate lines GL. Each of the pixel areas PA may be electrically connected to a data driver DD through one of the data lines DL.

The gate driver GD and the data driver DD may be controlled by a timing controller TC. For example, the gate driver GD may receive clock signals, reset signals and start signals from the timing controller TC, and the data driver DD may receive digital video data and a source timing signal from the timing controller TC.

The display panel DP may include a display area AA in which the pixel areas PA are disposed, and a bezel area BZ disposed outside the display area AA. The signal wirings GL and DL may extend beyond the display area AA. For example, an end of each signal wiring GL and LD may be disposed on the bezel area BZ. At least one of the gate driver GD, the data driver DD and the timing controller TC may be mounted on the bezel area BZ of the display panel DP. For example, the display device according to the embodiment of the present disclosure may be a GIP (Gate In Panel) type display device in which the gate driver GD is formed on the bezel area BZ of the display panel DP.

Figure 3:
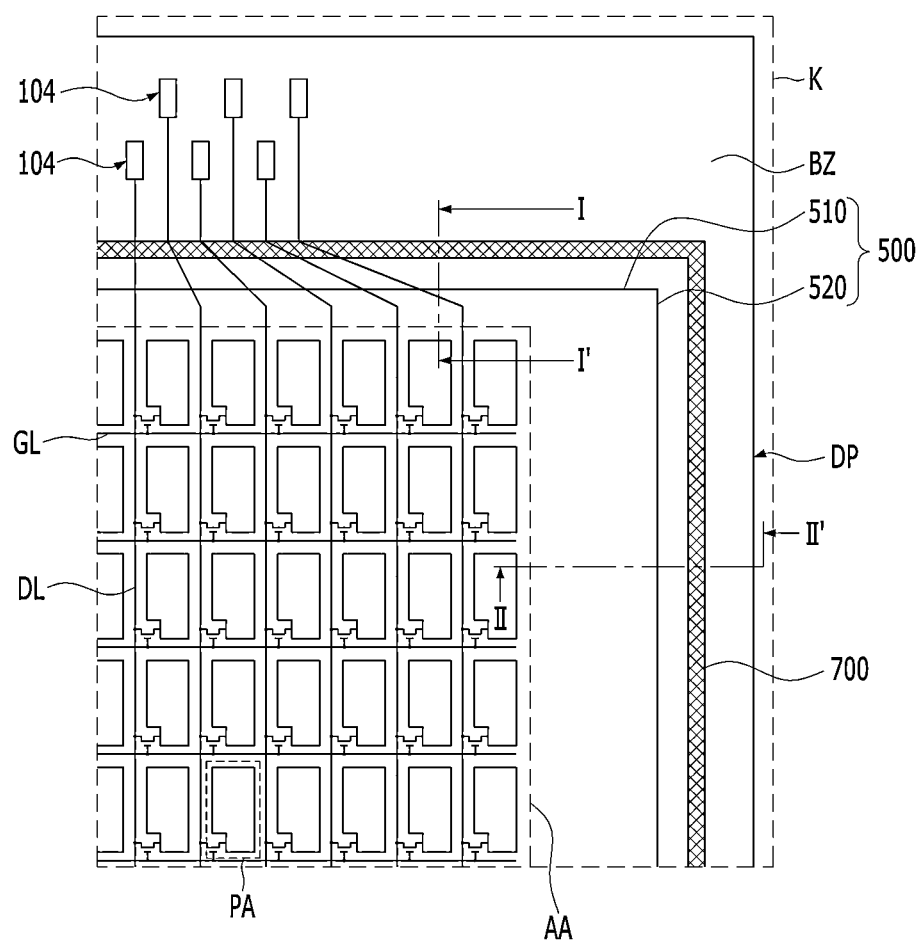
FIG. 3 is an enlarged view of K region in FIG. 1 according to an embodiment of the present disclosure.
Figure 4:
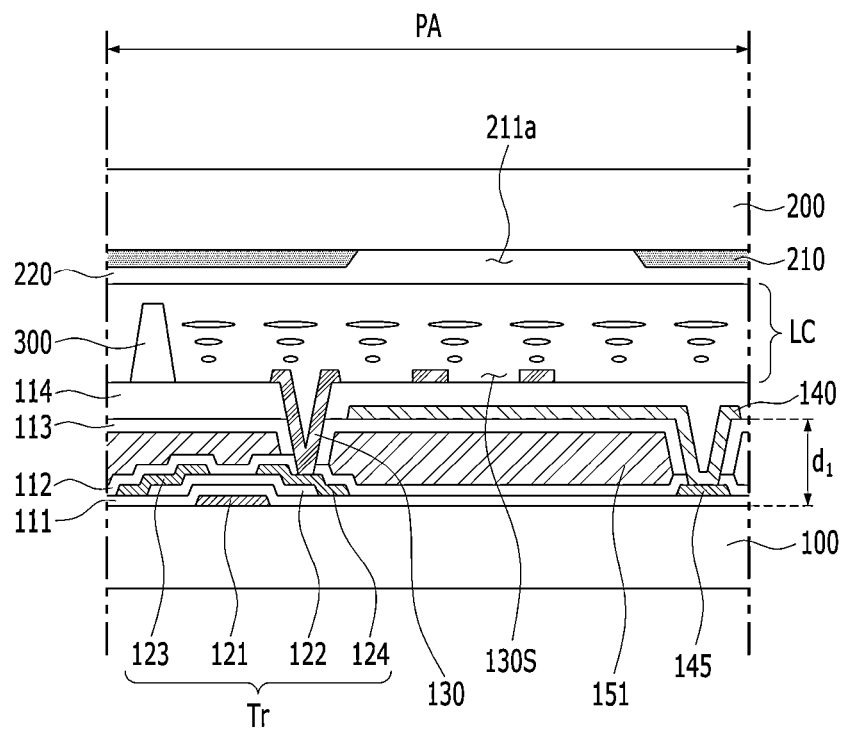
FIG. 4 is a view showing a cross-section of an unit pixel area in the display device according to the embodiment of the present disclosure.
Figure 5:
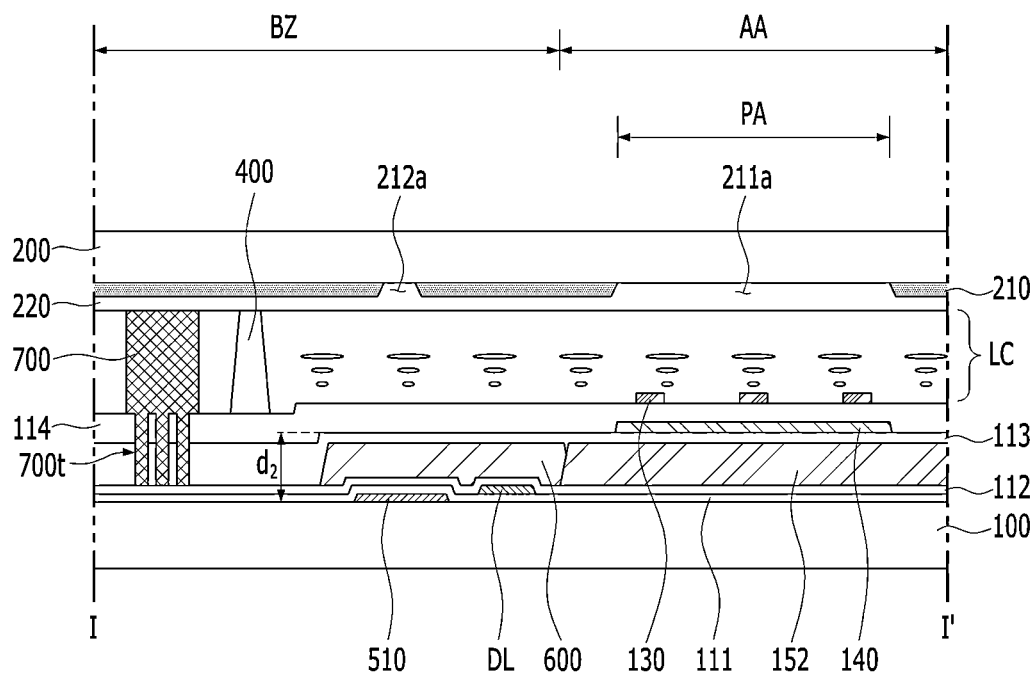
FIG. 5 is a view taken along I-I' of FIG. 3 according to an embodiment of the present disclosure.
Figure 6:
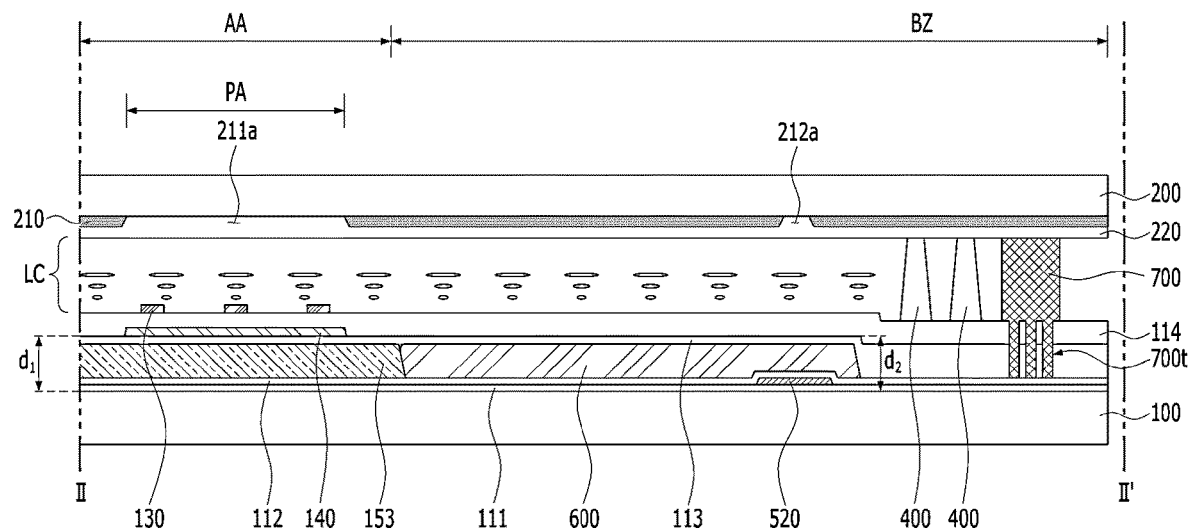
FIG. 6 is a view taken along II-II' of FIG. 3 according to an embodiment of the present disclosure.

FIG. 3 is an enlarged view of K region in FIG. 1. FIG. 4 is a view showing a cross-section of an unit pixel area in the display device according to the embodiment of the present disclosure. FIG. 5 is a view taken along I-I' of FIG. 3. FIG. 6 is a view taken along II-II' of FIG. 3.

Referring to FIGS. 2 to 6, the display panel DP of the display device according to the embodiment of the present disclosure may include a plurality of pads 104 on the bezel area BZ. Signal applied from outside of the display panel DP may be applied to each pixel area PA through the pads 104. For example, in the display device according to the embodiment of the present disclosure, each of the data lines DL may be electrically connected to one of the pads 104.

The display panel DP may include a liquid crystal layer LC disposed between a first substrate 100 and a second substrate 200. The first substrate 100 and the second substrate 200 may include an insulating material. The first substrate 100 and the second substrate 200 may include a transparent material. For example, the first substrate 100 and the second substrate 200 may include glass or plastic. The second substrate 200 may include a material different from the first substrate 100.

The liquid crystal layer LC may overlap the display area AA. A seal member 700 surrounding the liquid crystal layer LC may be disposed on the bezel area BZ. For example, the seal member 700 may extend along an edge of the display area AA. The liquid crystal layer LC may be disposed in a region defined by the seal member 700. Each of the signal wirings GL and DL may intersect the seal member 700.

The liquid crystal layer LC may have a transmittance corresponding to an electric field. An electric field corresponding to the data signal may be formed in each pixel area PA according to the gate signal. For example, a pixel electrode 130 electrically connected to driving circuit and a common electrode 140 including a region overlapping with the pixel electrode 130 may be disposed in each pixel area PA.

The driving circuit may supply a driving current corresponding to the data signal according to the gate signal for one frame. For example, the driving circuit may include at least one thin film transistor Tr and a storage capacitor Cst. The driving circuit may be disposed between the first substrate 100 and the liquid crystal layer LC. For example, the thin film transistor Tr and the storage capacitor Cst may be disposed between the first substrate 100 and the liquid crystal layer LC.

The thin film transistor Tr may include a gate electrode 121, an active layer 122, a source electrode 123 and a drain electrode 124. The thin film transistor Tr may generate the driving current corresponding to the data signal according to the gate signal. For example, the gate electrode 121 may be electrically connected to the gate line GL, and the source electrode 123 may be electrically connected to the data line DL. A voltage applied to the gate electrode 121 may be maintained by the storage capacitor Cst for one frame.

The gate electrode 121 may be disposed close to the first substrate 100. For example, the gate electrode 121 may be in direct contact with an upper surface of the first substrate 100 toward the liquid crystal layer LC. The gate electrode 121 may include a conductive material. For example, the gate electrode 121 may include a metal, such as aluminum (Al), chrome (Cr), copper (Cu), molybdenum (Mo), titanium (Ti) and tungsten (W).

The gate lines GL may be disposed on a same layer as the gate electrode 121. For example, the gate lines GL may include a same material as the gate electrode 121. The gate electrode 121 may be formed simultaneously with the gate lines GL.

The active layer 122 may be disposed on the gate electrode 121. For example, the gate electrode 121 may be disposed between the first substrate 100 and the active layer 122. The active layer 122 may include a semiconductor material. For example, the active layer 122 may include amorphous silicon (a-Si), polycrystalline silicon (Poly-Si) or an oxide semiconductor, such as IGZO. The active layer 122 may include a channel region between a source region and a drain region. The channel region of the active layer 122 may overlap the gate electrode 121. For example, the source region and the drain region of the active layer 122 may be disposed outside the gate electrode 121. The active layer 122 may be insulated from the gate electrode 121. For example, the channel region of the active layer 122 may have an electrical conductivity corresponding to a voltage applied to the gate electrode 121.

The source electrode 123 may include a conductive material. For example, the source electrode 123 may include a metal, such as aluminum (Al), chrome (Cr), copper (Cu), molybdenum (Mo), titanium (Ti) and tungsten (W). The source electrode 123 may include a material different from the gate electrode 121. The source electrode 123 may be disposed on a layer different from the gate electrode 121. For example, the source electrode 123 may be insulated from the gate electrode 121. The source electrode 123 may be electrically connected to the source region of the active layer 122. The source electrode 123 may include a region overlapping with the source region of the active layer 122. For example, the source electrode 123 may be in direct contact with the source region of the active layer 122.

The data lines DL may be disposed on a layer different from the gate lines GL. For example, the data lines DL may be disposed on a same layer as the source electrode 123. The data lines DL may include a same material as the source electrode 123. For example, the data lines DL may include a material different from the gate lines GL. The source electrode 123 may be formed simultaneously with the data lines DL. Thus, in the display device according to the embodiment of the present disclosure, the data lines DL may intersect the gate lines GL in the display area AA.

The drain electrode 124 may include a conductive material. For example, the drain electrode 124 may include a metal, such as aluminum (Al), chrome (Cr), copper (Cu), molybdenum (Mo), titanium (Ti) and tungsten (W). The drain electrode 124 may include a material different from the gate electrode 121. The drain electrode 124 may be disposed on a layer different from the gate electrode 121. For example, the drain electrode 124 may be insulated from the gate electrode 121. The drain electrode 124 may include a same material as the source electrode 123. The drain electrode 124 may be disposed on a same layer as the source electrode 123. For example, the drain electrode 124 may be formed simultaneously with the source electrode 123. The drain electrode 124 may be spaced apart from the source electrode 123. The drain electrode 124 may be electrically connected to the drain region of the active layer 122. The drain electrode 124 may include a region overlapping with the drain region of the active layer 122. For example, the drain electrode 124 may be in direct contact with the drain region of the active layer 122.

The driving current generated by the thin film transistor Tr may be supplied to the pixel electrode 130. For example, the pixel electrode 130 may be electrically connected to the drain electrode 124 of the thin film transistor Tr. The pixel electrode 130 may include a conductive material. The pixel electrode 130 may include a material having a high transmittance. For example, the pixel electrode 130 may be a transparent electrode made of a transparent conductive material, such as ITO and IZO. The pixel electrode 130 may include at least one slit 130S. The slit 130S may be disposed outside the driving circuit. For example, the slit 130S may not overlap the thin film transistor Tr.

The common electrode 140 may include a conductive material. For example, the common electrode 140 may include a material having a high transmittance. For example, the common electrode 140 may be a transparent electrode made of a transparent conductive material, such as ITO and IZO. The common electrode 140 may include a material different from the pixel electrode 130. The common electrode may be disposed on a layer different from the pixel electrode 130. For example, the common electrode 140 may be disposed between the first substrate 100 and the pixel electrode 130. The common electrode 140 may include a region overlapping with the slit 130S of the pixel electrode 130.

The common electrode 140 may be insulated from the pixel electrode 130. A constant voltage may be applied to the common electrode 140. For example, the common electrode 140 may be electrically connected to a common voltage supply line 145. Thus, in the display device according to the embodiment of the present disclosure, a portion of the liquid crystal layer LC overlapping with each pixel area PA may have a transmittance corresponding to a horizontal electric field formed between the pixel electrode 130 and the common electrode 140 of the corresponding pixel area PA. For example, in the display device according to the embodiment of the present disclosure, the liquid crystal layer LC may include liquid crystal of an IPS mode operated by a horizontal electric field.

The common voltage supply line 145 may include a conductive material. For example, the common voltage supply line 145 may include a metal, such as aluminum (Al), chrome (Cr), copper (Cu), molybdenum (Mo), titanium (Ti) and tungsten (W). The common voltage supply line 145 may be formed using a process of forming the driving circuit. For example, the common voltage supply line 145 may be formed simultaneously with the source electrode 123. The common voltage supply line 145 may be disposed on a same layer as the source electrode 123. The common voltage supply line 145 may include a same material as the source electrode 123.

The slit 130S of the pixel electrode 130 may be disposed outside the common voltage supply line 145. Thus, in the display device according to the embodiment of the present disclosure, light passing through each pixel area PA may have a luminance corresponding to an electric field formed between the pixel electrode 130 and the common electrode 140 of the corresponding pixel area PA. The light passing through each pixel area PA may display a specific color. For example, a color filter 151, 152 and 153 may be disposed on each pixel area PA. The color filter 151, 152 and 153 may be disposed between the first substrate 100 and the liquid crystal layer LC. The color filter 151, 152 and 153 of each pixel area PA may overlap the slit 130S of the pixel electrode 130 in the corresponding pixel area PA. For example, the color filter 151, 152 and 153 of each pixel area PA may be disposed between the thin film transistor Tr and the common voltage supply line 145 of the corresponding pixel area PA. The color filter 151, 152 and 153 of each pixel area PA may include a region overlapping with the thin film transistor Tr of the corresponding pixel area PA. For example, the color filter 151, 152 and 153 of each pixel area PA may include a region between the thin film transistor Tr and the liquid crystal layer LC of the corresponding pixel area PA. Thus, in the display device according to the embodiment of the present disclosure, a gap deviation between the first substrate 100 and the second substrate 200 due to the color filter 151, 152 and 153 of each pixel area PA may be mitigated.

Each of the pixel areas PA may realize a color different from adjacent pixel area PA. The color filter 151, 152 and 153 of each pixel area PA may include a material different from the color filter 151, 152 and 153 of adjacent pixel area PA. For example, the color filter 151, 152 and 153 of each pixel area PA may be one of a red color filter 151 displaying red color, a blue color filter 152 displaying blue color, and a green color filter 153 displaying green color. Thus, in the display device according to the embodiment of the present disclosure, the image made of various colors may be provided.

A plurality of insulating layers 111, 112, 113 and 114 for preventing or at least reducing unnecessary electrical connection in each pixel area PA may be disposed between the first substrate 100 and the liquid crystal layer LC. For example, a gate insulating layer 111, a lower passivation layer 112, a lower planarization layer 113 and a device passivation layer 114 may be disposed between the first substrate 100 and the liquid crystal layer LC.

The gate insulating layer 111 may insulate the active layer 122 of each pixel area PA from the gate electrode 121 of the corresponding pixel area PA. For example, the gate electrode 121 of each pixel area PA may be covered by the gate insulating layer 111. The active layer 122 of each pixel area PA may be disposed on the gate insulating layer 111. The gate insulating layer 111 may include an insulating material. For example, the gate insulating layer 111 may include an inorganic insulating material, such as silicon oxide (SiOx) and silicon nitride (SiNx).

The lower passivation layer 112 may be disposed on the gate insulating layer 111. The lower passivation layer 112 may prevent or at least reduce damage of the driving circuit in each pixel area PA due to external impact and moisture. For example, the thin film transistor Tr of each pixel area PA may be covered by the lower passivation layer 112. The lower passivation layer 112 may include an insulating material. For example, the lower passivation layer 112 may include an inorganic insulating material, such as silicon oxide (SiOx) and silicon nitride (SiNx). The common voltage supply line 145 may be disposed between the gate insulating layer 111 and the lower passivation layer 112.

The lower planarization layer 113 may be disposed on the lower passivation layer 112. The lower planarization layer 113 may remove a thickness difference due to the driving circuit and the color filter 151, 152 and 153 of each pixel area PA. For example, an upper surface of the lower planarization layer 113 toward the liquid crystal layer LC may be a flat surface. The lower planarization layer 113 may include an insulating material. The lower planarization layer 113 may include a material different from the lower passivation layer 112. For example, the lower planarization layer 113 may be an organic insulating material.

The color filter 151, 152 and 153 of each pixel area PA may be disposed on a layer different from the driving circuit and the common voltage supply line 145 of the corresponding pixel area PA. For example, the color filter 151, 152 and 153 of each pixel area PA may be disposed between the lower passivation layer 112 and the lower planarization layer 113. Thus, in the display device according to the embodiment of the present disclosure, the thickness difference due to the driving circuit and the common voltage supply line 145 of each pixel area PA may be effectively removed by the color filter 151, 152 and 153 and the lower passivation layer 112 of the corresponding pixel area PA. The common electrode 140 of each pixel area PA may be in direct contact with the upper surface of the lower planarization layer 113. For example, the common electrode 140 of each pixel area PA may be in direct contact with the common voltage supply line 145 by penetrating the lower passivation layer 112 and the lower planarization layer 113. Therefore, in the display device according to the embodiment of the present disclosure, a deviation in an electric field due to a curve of the common electrode 140 in each pixel area PA may be prevented or at least reduced.

The device passivation layer 114 may be disposed on the lower planarization layer 113. The device passivation layer 114 may insulate the pixel electrode 130 of each pixel area PA from the common electrode 140 of the corresponding pixel area PA. For example, the common electrode 140 of each pixel area PA may be covered by the device passivation layer 114. The pixel electrode 130 of each pixel area PA may be disposed on the device passivation layer 114. The pixel electrode 130 of each pixel area PA may be in direct contact with the drain electrode 124 of the corresponding pixel area PA by penetrating the lower passivation layer 112, the lower planarization layer 113 and the device passivation layer 114. The device passivation layer 114 may include an insulating material. For example, the device passivation layer 114 may include an inorganic insulating material, such as silicon oxide (SiOx) and silicon nitride (SiNx).

A black matrix 210 may be disposed between the liquid crystal layer LC and the second substrate 200. The driving circuit and the common voltage supply line 145 of each pixel area PA may be not recognized by the black matrix 210. For example, the black matrix 210 may overlap the thin film transistor Tr and the common voltage supply line 145 of each pixel area PA. The black matrix 210 may include first openings 211a overlapping with the pixel areas PA. The color filter 151, 152 and 153 of each pixel area PA may overlap one of the first openings 211a of the black matrix 210. Thus, in the display device according to the embodiment of the present disclosure, only light passing through a portion of the liquid crystal layer LC having a transmittance corresponding to an electric field formed between the pixel electrode 130 and the common electrode 140 of each pixel area PA may be provided to the user. That is, in the display device according to the embodiment of the present disclosure, decrease in visibility of the image due to the common voltage supply line 145 may be prevented or at least reduced. Therefore, in the display device according to the embodiment of the present disclosure, the quality of the image may be improved.

An upper planarization layer 220 covering the black matrix 210 may be disposed between the liquid crystal layer LC and the second substrate 200. The upper planarization layer 220 may remove a thickness difference due to the black matrix 210. For example, a lower surface of the upper planarization layer 220 toward the liquid crystal layer LC may be a flat surface. The lower surface of the upper planarization layer 220 may be parallel to the upper surface of the lower planarization layer 114 in the display area AA. For example, the first openings 211a of the black matrix 210 may be filled by the upper planarization layer 220. Thus, in the display device according to the embodiment of the present disclosure, a distortion in a travelling direction of light due to a curve of the lower surface of the upper planarization layer 220 may be prevented or at least reduced in the display area AA. The upper planarization layer 220 may include an insulating material. For example, the upper planarization layer 220 may include an organic insulating material.

The gate insulating layer 111, the lower passivation layer 112, the lower planarization layer 113, the device passivation layer 114, the black matrix 210 and the upper planarization layer 220 may extend onto the bezel area BZ. For example, the seal member 700 may be disposed between the device passivation layer 114 and the upper planarization layer 220 of the bezel area BZ. The lower surface of the upper planarization layer 220 and an upper surface of the device passivation layer 114 opposite to the first substrate 100 may include a region contacting the seal member 700. The black matrix 210 may include a region overlapping with the seal member 700. The lower planarization layer 113 and the device passivation layer 114 may include a seal trench 700t overlapping with the seal member 700. The seal member 700 may include a region within the seal trench 700t. For example, the seal member 700 may be in direct contact with a portion of the lower passivation layer 112 exposed by the seal trench 700t. The seal member 700 may be in direct contact with the lower planarization layer 113 and the device passivation layer 114 within the seal trench 700t. Thus, in the display device according to the embodiment of the present disclosure, a penetration of external moisture through the lower planarization layer 113 may be blocked. Therefore, in the display device according to the embodiment of the present disclosure, damage of the thin film transistor Tr in each pixel area PA due to the external moisture may be prevented or at least reduced.

The black matrix 210 may include a second opening 212a disposed outside the display area AA. For example, the second opening 212a may be disposed between the display area AA and the seal member 700. The second opening 212a may extend along an edge of the display area AA. For example, the second opening 212a may extend in parallel to the seal member 700. The second opening 212a may be filled by the upper planarization layer 220. The upper planarization layer 220 may include a material having a water vapor transmission ratio (WVTR) lower than the black matrix 210. Thus, in the display device according to the embodiment of the present disclosure, a penetration of moisture through the black matrix 210 may be prevented or at least reduced. Therefore, in the display device according to the embodiment of the present disclosure, a deterioration of the image due to the penetration of the external moisture may be prevented or at least reduced.

A conductive pattern 500 overlapping with the second opening 212a of the black matrix 210 may be disposed between the first substrate 100 and the liquid crystal layer LC of the bezel area BZ. The conductive pattern 500 may extend along the second opening 212a of the black matrix 210. For example, the conductive pattern 500 may extend in parallel to the seal member 700. The conductive pattern 500 may include a material capable of blocking light. For example, the conductive pattern 500 may include a metal, such as aluminum (Al), chrome (Cr), copper (Cu), molybdenum (Mo), titanium (Ti) and tungsten (W). Thus, in the display device according to the embodiment of the present disclosure, a decrease in visibility due to light passing through the second opening 212a of the black matrix 210 may be prevented or at least reduced. The conductive pattern 500 may be formed using a process of forming the driving circuit in each pixel area PA.

The second opening 212a of the black matrix 210 may cross the signal wirings GL and DL. For example, each of the signal wirings GL and DL may include a region overlapping with the second opening 212a. The conductive pattern 500 may intersect the signal wirings GL and DL. For example, the conductive pattern 500 may include a first conductive pattern 510 intersecting the data lines DL and a second conductive pattern 520 extending in a direction perpendicular to the first conductive pattern 510.

The first conductive pattern 510 may be disposed on a layer different from the data lines DL. For example, the first conductive pattern 510 may be disposed on a same layer as the gate electrode 121 of each pixel area PA. The first conductive pattern 510 may include a same material as the gate electrode 121 of each pixel area PA. The first conductive pattern 510 may be formed simultaneously with the gate electrode 121 of each pixel area PA. For example, the first conductive pattern 510 may be disposed between the first substrate 100 and the gate insulating layer 111.

The second conductive pattern 520 may intersect the gate lines GL. The second conductive pattern 520 may be disposed on a layer different from the gate lines GL. For example, the second conductive pattern 520 may be disposed on a same layer as the source electrode 123 of each pixel area PA. The second conductive pattern 520 may include a same material as the source electrode 123 of each pixel area PA. The second conductive pattern 520 may be formed simultaneously with the source electrode 123 of each pixel area PA. For example, the second conductive pattern 520 may be disposed between the gate insulating layer 111 and the lower passivation layer 112.

A dummy color pattern 600 may be disposed between the first substrate 100 and the liquid crystal layer LC of the bezel area BZ. The dummy color pattern 600 may cover the conductive pattern 500. For example, the dummy color pattern 600 may include a region overlapping with the second opening 212a of the black matrix 210. The dummy color pattern 600 may include a material realizing a specific color. For example, the dummy color pattern 600 may include a dye or a pigment. The dummy color pattern 600 may include a same material as one of the color filters 151, 152 and 153. For example, the dummy color pattern 600 may include a same material as the blue color filter 152 displaying blue color having a relative low wavelength range. Thus, in the display device according to the embodiment of the present disclosure, a deterioration of the image due to the external light reflected by the conductive pattern 500 may be prevented or at least reduced.

The dummy color pattern 600 may be disposed on a same layer as the color filters 151, 152 and 153. For example, the dummy color pattern 600 may be disposed between the lower passivation layer 112 and the lower planarization layer 113. The dummy color pattern 600 may be formed using a process of forming the color filters 151, 152 and 153. For example, the dummy color pattern 600 may be formed simultaneously with the blue color filter 152. Thus, in the display device according to the embodiment of the present disclosure, process efficiency may be improved.

The dummy color pattern 600 may extend in a direction of the display area AA. For example, the dummy color pattern 600 may include a region disposed between the display area AA and the second opening 212a. The color filter 151, 152 and 153 of the pixel area PA adjacent to the bezel area BZ may be in direct contact with the dummy color pattern 600. For example, a boundary line between the dummy color pattern 600 and the blue color filter 152 of the pixel area PA adjacent to the bezel area BZ may not be recognized. Thus, in the display device according to the embodiment of the present disclosure, steps due to the dummy color pattern 600 may be minimized or at least reduced. For example, in the display device according to the embodiment of the present disclosure, an upper surface of the lower planarization layer 113 between the display area AA and the second opening 212a may be a flat surface. A distance d2 between the first substrate 100 and the upper surface of the lower planarization layer 113 between the display area AA and the second opening 212a may be the same as a distance d1 between the first substrate 100 and the upper surface of the lower planarization layer 113 in the pixel areas PA. That is, in the display device according to the embodiment of the present disclosure, the upper surface of the lower planarization layer 113 may have a same level in the display area AA and between the display area AA and the second opening 212a. Therefore, in the display device according to the embodiment of the present disclosure, a curve may be not formed at the upper surface of the lower planarization layer 113 on the bezel area BZ.

As illustrated in FIG. 5, the lower planarization layer 113 has a lower surface that covers both the dummy color pattern 600 and the color filter 152 and an upper surface that faces the liquid crystal layer LC. In some embodiments, the dummy color pattern 600 and the color filter 152 have a same height. In some embodiments, a portion of the dummy color pattern 600 that overlaps with the second opening 212a and a portion of the color filter 152 in the pixel area PA have a same height. As such, the distance d2 between the first substrate 100 and the upper surface of the lower planarization layer 113 in the bezel area overlapping the second opening 212a and the distance d1 between the first substrate 100 and the upper surface of the lower planarization layer 113 in the pixel area PA are the same due to the heights of the color filter 152 and the dummy color pattern 600 being the same.

At least one gap spacer 400 may be disposed between the device passivation layer 114 and the upper planarization layer 220 of the bezel area BZ. The gap spacer 400 may maintain a gap between the first substrate 100 and the second substrate 200. The gap spacer 400 may be disposed outside the dummy color pattern 600. Thus, in the display device according to the embodiment of the present disclosure, a position of an upper surface of the gap spacer 400 may be not affected by the dummy color pattern 600. For example, the gap spacer 400 may be disposed between the second opening 212a and the seal member 700. That is, in the display device according to the embodiment of the present disclosure, the upper surface of the gap spacer 400 may have a constant level. For example, a lower surface of the gap spacer 400 toward the first substrate 100 may be in overall contact the upper surface of the device passivation layer 114, and the upper surface of the gap spacer 400 toward the second substrate 200 may be in overall contact with the lower surface of the upper planarization layer 220. Therefore, in the display device according to the embodiment of the present disclosure, a gap between the first substrate 100 and the second substrate 200 may be stably maintained by the gap spacer 400.

Accordingly, the display device according to the embodiment of the present disclosure may include the black matrix 210 between the liquid crystal layer LC and the second substrate 200 and the color filters 151, 152 and 153 disposed between the first substrate 100 and the liquid crystal layer LC of each pixel area PA, wherein the black matrix 210 may include the second opening 212a disposed between the display area AA and the seal member 700, wherein the dummy color pattern 600 may be formed between a portion of the conductive pattern 500 overlapping with the second opening 212a and the liquid crystal layer LC by using a process of forming the color filters 151, 152 and 153, and wherein the dummy color pattern 600 may include a region overlapping with the second opening 212a of the black matrix 210 and a region disposed between the display area AA and the second opening 212a. Thus, in the display device according to the embodiment of the present disclosure, the upper surface of the lower planarization layer 113 covering the color filters 151, 152 and 153 and the dummy color pattern 600 may have a minimum curve. For example, in the display device according to the embodiment of the present disclosure, the upper surface of the lower planarization layer 113 may have a same level between the display area AA and the second opening 212a. And, in the display device according to the embodiment of the present disclosure, the upper surface of the gap spacer 400 disposed between the display area AA and the second opening 212a or between the second opening 212a and the seal member 700 may have a constant level. Therefore, in the display device according to the embodiment of the present disclosure, the distortion of the image due to the deviation in the gap between the first substrate 100 and the second substrate 200 may be prevented or at least reduced.

In the display device according to the embodiment of the present disclosure, at least bump spacer 300 overlapping with the black matrix 210 may be disposed in the display area AA. The bump spacer 300 may prevent or at least reduce damage of the pixel electrode 130 in each pixel area PA due to the second substrate 200 being bent by an external force. For example, a thickness of the bump spacer 300 may be smaller than a gap between the device passivation layer 114 and the upper planarization layer 220 in each pixel area PA. The bump spacer 300 may be spaced apart from the upper surface of the device passivation layer 114 or the lower surface of the upper planarization layer 220 in the pixel area PA. For example, a lower surface of the bump spacer 300 toward the first substrate 100 may be in direct contact with the upper surface of the device passivation layer 114, and an upper surface of the bump spacer 300 toward the second substrate 200 may be spaced apart from the lower surface of the upper planarization layer 220. A distance between the upper surface of the device passivation layer 114 and the lower surface of the upper planarization layer 220 in each pixel area PA may be smaller than a distance between the upper surface of the device passivation layer 114 and the lower surface of the upper planarization layer 220 between the second opening 212a and the seal member 700. For example, a thickness of the bump spacer 300 may be smaller than a thickness of the gap spacer 400. Thus, in the display device according to the embodiment of the present disclosure, the damage of the pixel electrode 130 in each pixel area PA due to the external force may be effectively prevented or at least reduced.

Figure 7:
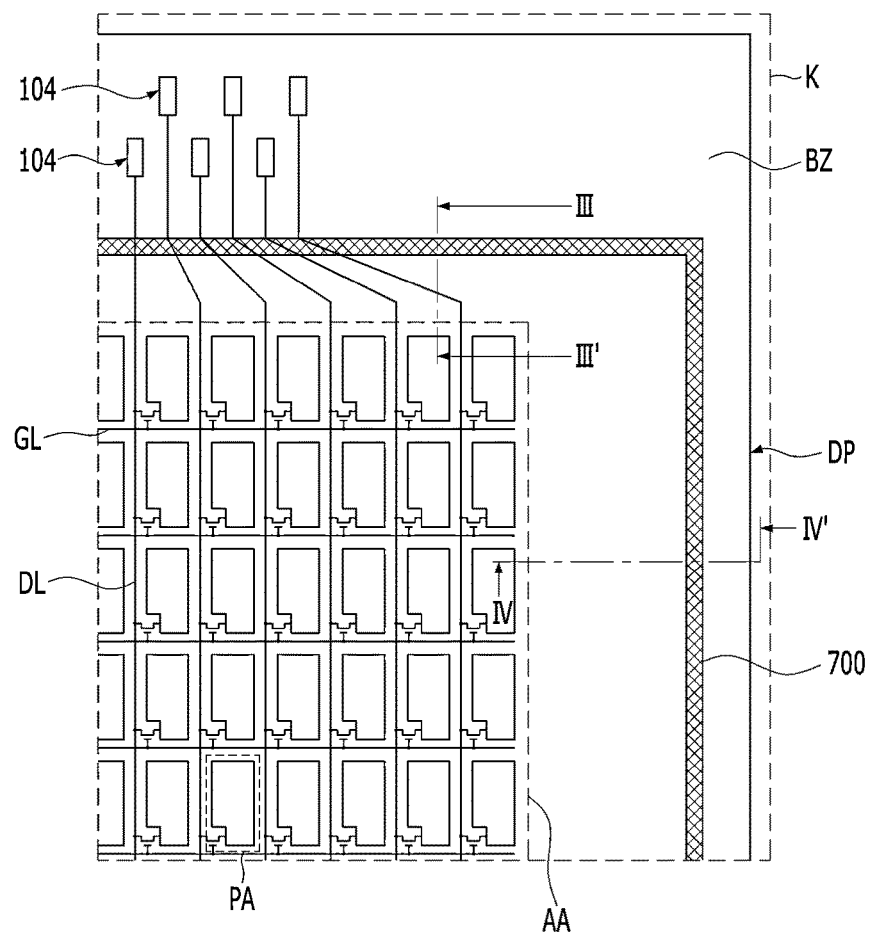
FIGS. 7 to 11 are views showing the display device according to another embodiment of the present disclosure.
Figure 8:
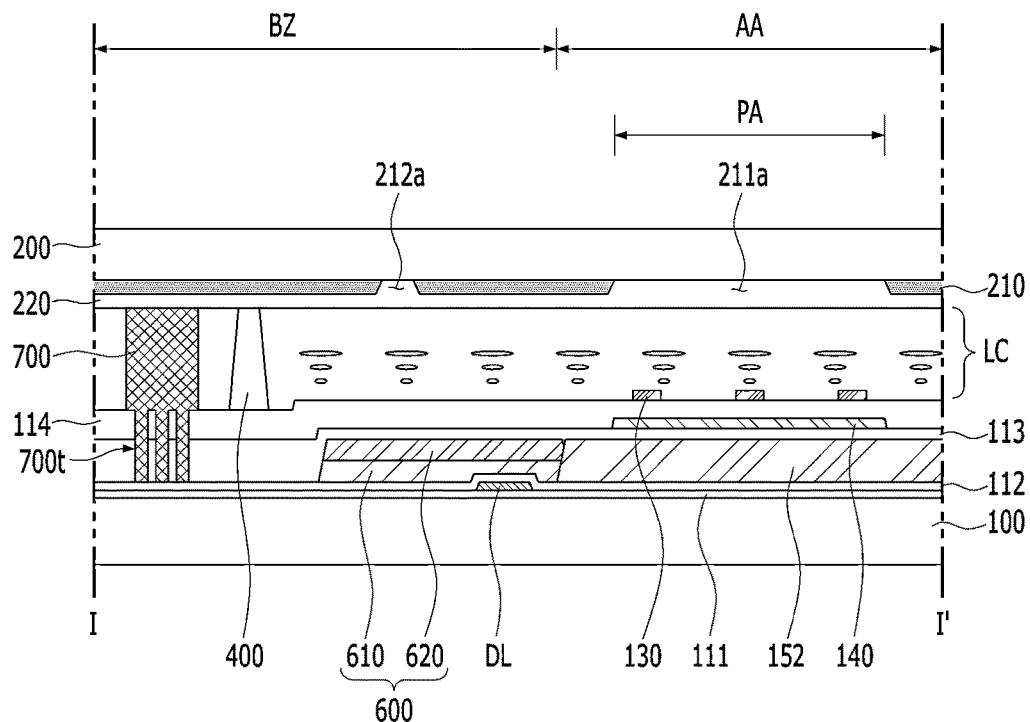
Figure 9:
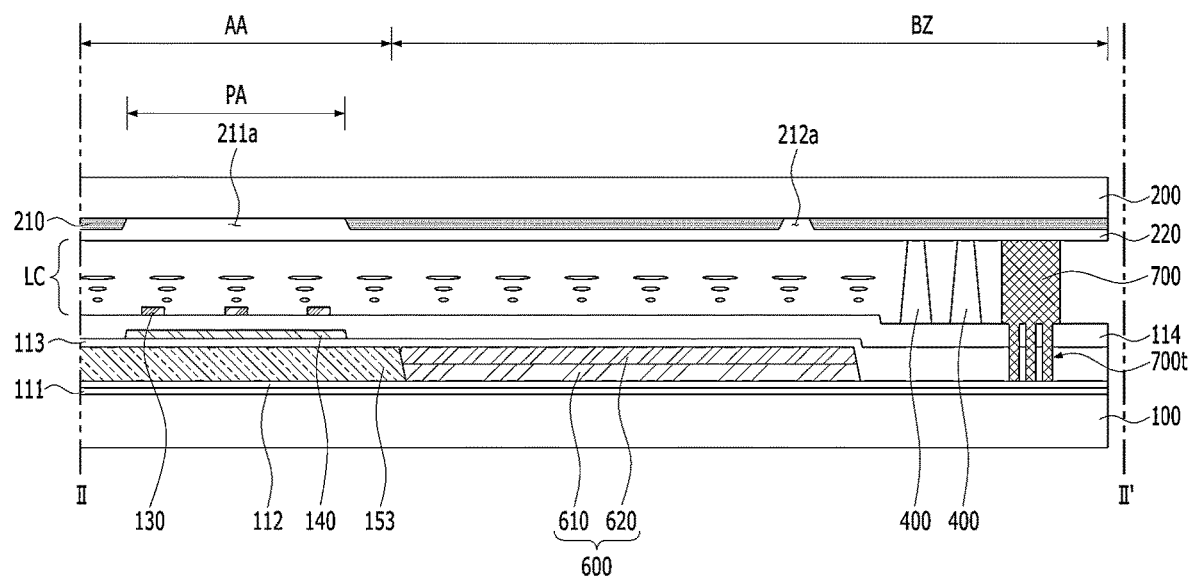

The display device according to the embodiment of the present disclosure is described as the dummy color pattern 600 has a single-layer structure. However, in the display device according to another embodiment of the present disclosure, the dummy color pattern 600 may have a multi-layer structure. For example, in the display device according to another embodiment of the present disclosure, the dummy color pattern 600 may have a stacked structure of a first dummy color layer 610 and a second dummy color layer 620, as shown in FIGS. 7 to 9. The second dummy color layer 620 may include a material different from the first dummy color layer 610. For example, the first dummy color layer 610 may include a same material as the blue color filter 152, and the second dummy color layer 620 may include a same material as the red color filter 151. Thus, in the display device according to another embodiment of the present disclosure, the dummy color pattern 600 may function as a black matrix. That is, in the display device according to another embodiment of the present disclosure, the conductive pattern 500 for preventing or at least reducing the deterioration of the image due to the light passing through the second opening 212a of the black matrix 210 may be not formed. Therefore, in the display device according to another embodiment of the present disclosure, process efficiency may be improved.

Figure 10:
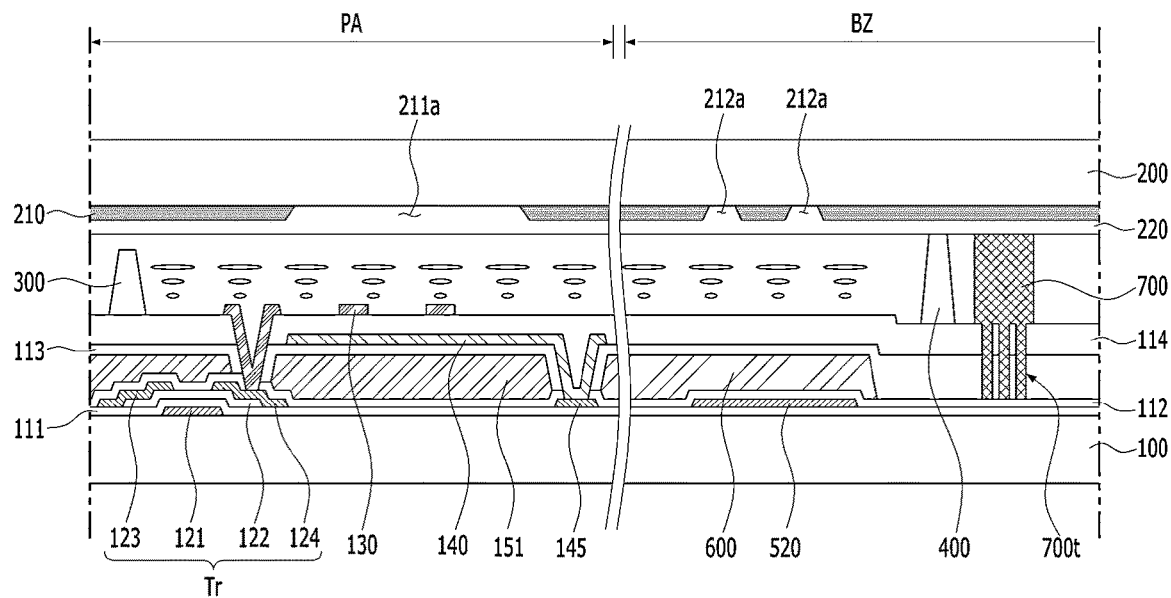

The display device according to the embodiment of the present disclosure is described as the black matrix 210 includes a single second opening 212a between the display area AA and the seal member 700. However, in the display device according to another embodiment of the present disclosure, the black matrix 210 may include a plurality of the second openings 212a overlapping with the bezel area BZ. For example, in the display device according to another embodiment of the present disclosure, two second openings 212a may be formed at the black matrix 210 between the display area AA and the seal member 700, as shown in FIG. 10. The conductive pattern 520 and the dummy color pattern 600 may overlap the two second openings 212a. Thus, in the display device according to another embodiment of the present disclosure, the degree of freedom for the position and the number of the second openings 212a may be improved.

Figure 11:
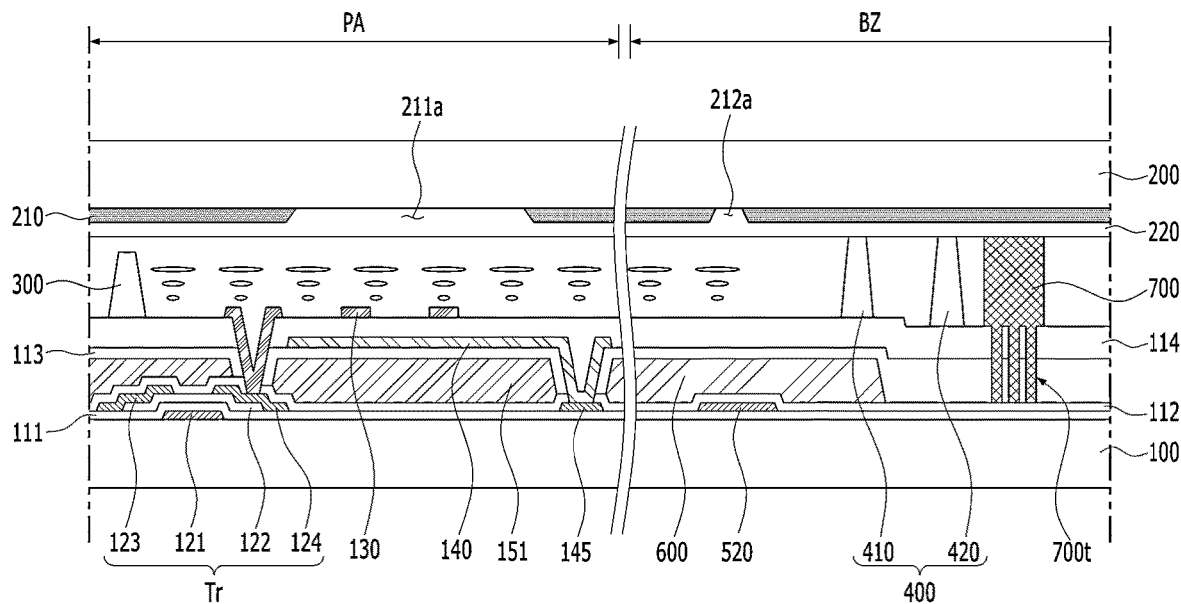

The display device according to the embodiment of the present disclosure is described that the gap spacer 400 is disposed only between the second opening 212a and the seal member 700. However, the display device according to another embodiment of the present disclosure may include the gap spacer 400 disposed at various locations. For example, in the display device according to another embodiment of the present disclosure, the gap spacer 400 may include at least one first spacer 410 disposed between the display area AA and the second opening 212a and at least one second spacer 420 disposed between the second opening 212a and the seal member 700, as shown in FIG. 11. Each of the first spacer 410 and the second spacer 420 may be in direct contact with the device passivation layer 114 and the upper planarization layer 220 of the bezel area BZ. For example, the first spacer 410 may have a size smaller than the second spacer 420. Thus, in the display device according to another embodiment of the present disclosure, an upper surface of the first spacer 410 may be a same level as an upper surface of the second spacer 420. That is, in the display device according to another embodiment of the present disclosure, the gap between the first substrate 100 and the second substrate 200 may be stably maintained by the first spacer 410 and the second spacer 420. Therefore, in the display device according to another embodiment of the present disclosure, the deterioration of the image due to the deviation in the gap between the first substrate 100 and the second substrate 200 may be effectively prevented or at least reduced.

In the result, the display device according to the embodiments of the present disclosure may comprise the liquid crystal layer between the first substrate and the second substrate and the dummy color pattern between the first substrate and the liquid crystal layer, wherein the dummy color pattern on the bezel area disposed outside the display area may include a region overlapping with the second opening of the black matrix disposed on the bezel area and a region disposed between the display area and the second opening. Thus, in the display device according to the embodiments of the present disclosure, the curve formed in the upper surface of the lower planarization layer covering the color filters and the dummy color pattern between the display area and the second opening may be minimized or at least reduced. Thereby, in the display device according to the embodiments of the present disclosure, the distortion of the image due to the deviation in the gap between the first substrate and the second substrate may be prevented or at least reduced.

What is claimed is:

1. A display device comprising:
   a first substrate including a display area and a bezel area surrounding the display area, the display area comprising a pixel area where an image is displayed;
   a second substrate on the first substrate;
   a liquid crystal layer between the first substrate and the second substrate, at least a portion of the liquid crystal layer is in the display area;
   a seal member between the first substrate and the second substrate in the bezel area, the seal member surrounding the liquid crystal layer;
   a color filter between the first substrate and the liquid crystal layer in the pixel area of the display area;
   a black matrix between the liquid crystal layer and the second substrate in the display area and the bezel area, the black matrix including a first opening in the pixel area and a second opening in the bezel area such that the second opening is between the seal member and a boundary between the display area and the bezel area;
   a dummy color pattern between the first substrate and the liquid crystal layer in the bezel area; and
   a lower planarization layer between the first substrate and the liquid crystal layer, the color filter in the display area and the dummy color pattern in the bezel area covered by the lower planarization layer,
   wherein the dummy color pattern overlaps the second opening of the black matrix and the dummy color pattern extends to the boundary between the display area and the bezel area,
   wherein the color filter includes a region overlapping with the first opening of the black matrix in the pixel area of the display area,
   wherein an upper surface of a portion of the lower planarization layer between the color filter and the first opening of the black matrix in the pixel area has a same level as an upper surface of a portion of the lower planarization layer overlapping with the black matrix in the display area, and
   wherein an upper surface of a portion of the lower planarization layer overlapping with the dummy color pattern has a same level as the upper surface of a portion of the lower planarization layer between the color filter and the first opening of the black matrix in the pixel area.

2. The display device according to claim 1, wherein the dummy color pattern and the color filter include a same material.

3. The display device according to claim 1, further comprising:
   a conductive pattern between the first substrate and the dummy color pattern in the bezel area, the conductive pattern overlapping the second opening of the black matrix.

4. The display device according to claim 3, wherein the conductive pattern includes a metal.

5. The display device according to claim 3, wherein the dummy color pattern comprises a first dummy color layer and a second dummy color layer that is on the first dummy color layer, wherein the first dummy color layer includes a material that is different from a material of the second dummy color layer.

6. The display device according to claim 3, wherein the second opening of the black matrix and the conductive pattern extend in parallel along a length of the seal member.

7. The display device according to claim 1, wherein a portion of an upper surface of the lower planarization layer between the display area and the second opening is flat in a cross-section view of the display device.

8. The display device according to claim 7, wherein a distance between a first portion of the first substrate and a first portion of the upper surface of the lower planarization layer that is between the boundary and the second opening is a same as a distance between a second portion of the first substrate and a second portion of the upper surface of the lower planarization layer in the pixel area.

9. The display device according to claim 7, further comprising:
   a device passivation layer between the lower planarization layer and the liquid crystal layer;
   an upper planarization layer between the liquid crystal layer and the second substrate, the upper planarization layer covering the black matrix; and
   at least one gap spacer between the device passivation layer and the upper planarization layer in the bezel area, wherein the at least one gap spacer is between the dummy color pattern and the seal member in the cross-section view of the display device.

10. The display device according to claim 9, wherein the at least one gap spacer is in contact with the device passivation layer and the upper planarization layer of the bezel area.

11. The display device according to claim 9, further comprising:
   a seal trench in the lower planarization layer and the device passivation layer in the bezel area, the seal trench overlapping with the seal member, and wherein the seal member extends into the seal trench.

12. The display device according to claim 1, further comprising:
   a pixel electrode between the color filter and the liquid crystal layer, the pixel electrode including at least one slit;
   a common electrode between the color filter and the pixel electrode, the common electrode including a region overlapping with the at least one slit; and
   a thin film transistor between the first substrate and the liquid crystal layer in the pixel area, the thin film transistor electrically connected to the pixel electrode, wherein the color filter includes a region between the thin film transistor and the liquid crystal layer.

13. The display device according to claim 12, further comprising:
   a pad in the bezel area; and
   a signal wiring in the bezel area, the signal wiring electrically connecting the thin film transistor to the pad,
   wherein the signal wiring is between the display area and the seal member and is between the first substrate and the dummy color pattern in a cross-section view of the display device.

14. A display device comprising:
   a substrate including a display area and a bezel area, the display area comprising a pixel area where an image is displayed;

a liquid crystal layer on the substrate, the liquid crystal layer in the display area and the bezel area;

a color filter between the substrate and the liquid crystal layer in the pixel area of the display area;

a black matrix on the liquid crystal layer, the black matrix including a first opening in the pixel area and a second opening in the bezel area, the first opening overlapping the color filter;

a lower planarization layer between the liquid crystal layer and the substrate in the display area and the bezel area; and a dummy color pattern between the lower planarization layer and the substrate in the bezel area, the dummy color pattern overlapping with the second opening of the black matrix, wherein the color filter in the display area and the dummy color pattern in the bezel area are covered by the lower planarization layer, and wherein a first distance between a first portion of the substrate in the pixel area and an upper surface of a first portion of the lower planarization layer in the pixel area that is disposed between the color filter and the first opening is a same as a distance between a second portion of the substrate that overlaps the second opening in the bezel area and the upper surface of a second portion of the lower planarization layer that overlaps the dummy color pattern, and wherein a distance between a third portion of the substrate and an upper surface of a third portion of the lower planarization layer that overlap the black matrix in the display area is a same as the first distance.

15. The display device of claim 14, further comprising:
a dummy color pattern in the bezel area, the dummy color pattern between the substrate and the liquid crystal layer and overlapping the second portion of the substrate, the second portion of the lower planarization layer, and the second opening of the black matrix.

16. The display device of claim 15, wherein a portion of the dummy color pattern that overlaps the second opening and a portion of the color filter in the pixel area have a same height.

17. The display device of claim 14, further comprising:
a seal member on the substrate in the bezel area and surrounding the liquid crystal layer, the second opening of the black matrix extends parallel to the seal member.

18. The display device of claim 15, wherein the dummy color pattern and the color filter include a same material.

19. The display device of claim 15, wherein the dummy color pattern includes a first dummy color layer and a second dummy color layer on the first dummy color layer,
wherein the first dummy color layer includes a material that is different from a material of the second dummy color layer.

20. A display device comprising:
a substrate including a display area and a bezel area, the display area comprising a pixel area where an image is displayed;
a liquid crystal layer on the substrate, the liquid crystal layer in the display area and the bezel area;
a color filter between the substrate and the liquid crystal layer in the pixel area of the display area;
a dummy color pattern between the substrate and the liquid crystal layer in the bezel area;
a black matrix on the liquid crystal layer, the black matrix including a first opening in the pixel area and a second opening overlapping the dummy color pattern in the bezel area; and
a lower planarization layer between the liquid crystal layer and the color filter in the display area and between the dummy color pattern and the liquid crystal layer in the bezel area,
wherein the color filter in the display area and the dummy color pattern in the bezel area are covered by the lower planarization layer,
wherein a height of a portion of the dummy color pattern that overlaps with the second opening in the bezel area is a same as a height of a portion of the color filter in the pixel area,
wherein an upper surface of a portion of the lower planarization layer that overlaps the black matrix in the display area has a same level as an upper surface of a portion of the lower planarization layer overlapping with the color filter, and
wherein an upper surface of a portion of the lower planarization layer overlapping with the dummy color pattern has a same level as the upper surface of a portion of the lower planarization layer overlapping with the color filter.

21. The display device of claim 20, wherein the color filter overlaps the first opening of the black matrix.

22. The display device of claim 20, further comprising a lower planarization layer between the liquid crystal layer and the substrate in the display area and the bezel area,
wherein a first distance between a first portion of the substrate in the pixel area and a first portion of a surface of the lower planarization layer in the pixel area that overlaps the first portion of the substrate is a same as a distance between a second portion of the substrate that overlaps the second opening in the bezel area and a second portion of the surface of the lower planarization layer that overlaps the second portion of the substrate and the second opening in the bezel area.

23. The display device of claim 1, wherein the lower planarization layer is in contact with the color filter and the dummy color pattern.

24. The display device of claim 1, wherein the black matrix is spaced apart from the color filter such that the black matrix does not contact any color filter in the display area.

* * * * *